United States Patent [19]

Winner

[11] Patent Number: 4,553,922

[45] Date of Patent: Nov. 19, 1985

[54] APPARATUS FOR PROCESSING MATERIAL

[76] Inventor: Eduard Winner, Weierstrasse 3, CH-9500 Wil, Switzerland

[21] Appl. No.: 653,495

[22] Filed: Sep. 21, 1984

[30] Foreign Application Priority Data

Sep. 21, 1983 [DE] Fed. Rep. of Germany ....... 3334012

[51] Int. Cl.[4] .............................................. B29F 3/02
[52] U.S. Cl. ............................. 425/381.2; 264/176 C
[58] Field of Search .................. 425/381.2, DIG. 230; 264/176 C

[56] References Cited

U.S. PATENT DOCUMENTS

| | | | |
|---|---|---|---|
| 3,611,490 | 10/1971 | Neuville et al. | 425/381.2 |
| 3,689,189 | 9/1972 | Wagner | 425/381.2 |
| 3,695,575 | 10/1972 | Hauser | 425/381.2 X |
| 3,748,074 | 7/1973 | Nitta et al. | 425/381.2 X |
| 3,790,328 | 2/1974 | Maxwell | 425/381.2 |
| 4,436,502 | 3/1984 | Nelson et al. | 425/DIG. 230 |

FOREIGN PATENT DOCUMENTS 1221112   1/1960   France ............................... 425/381.2

*Primary Examiner*—J. Howard Flint, Jr.
*Attorney, Agent, or Firm*—Becker & Becker, Inc.

[57] ABSTRACT

An apparatus for handling and processing very different types of material, for example by means of homogenizing, predosing, plasticizing, or mixing. Accommodated in a working chamber of the apparatus is a rotatably driven processing tool which supplies the material, during the processing, to an outlet of the housing. The working chamber is provided with a conveying section which tapers in cross section in the direction toward the outlet, and which, in the direction of conveyance of the material, passes into a processing section of the working chamber. The processing section also tapers in cross section in the direction of the outlet, yet tapers more markedly than does the conveying section. The processing of the materials takes place in the processing section, while in the conveying section the materials are conveyed into the processing section. Depending upon the cross sectional taper, the materials can be mixed, homogenized, or plasticized.

14 Claims, 7 Drawing Figures

U.S. Patent  Nov. 19, 1985  Sheet 1 of 2  4,553,922
Fig.1
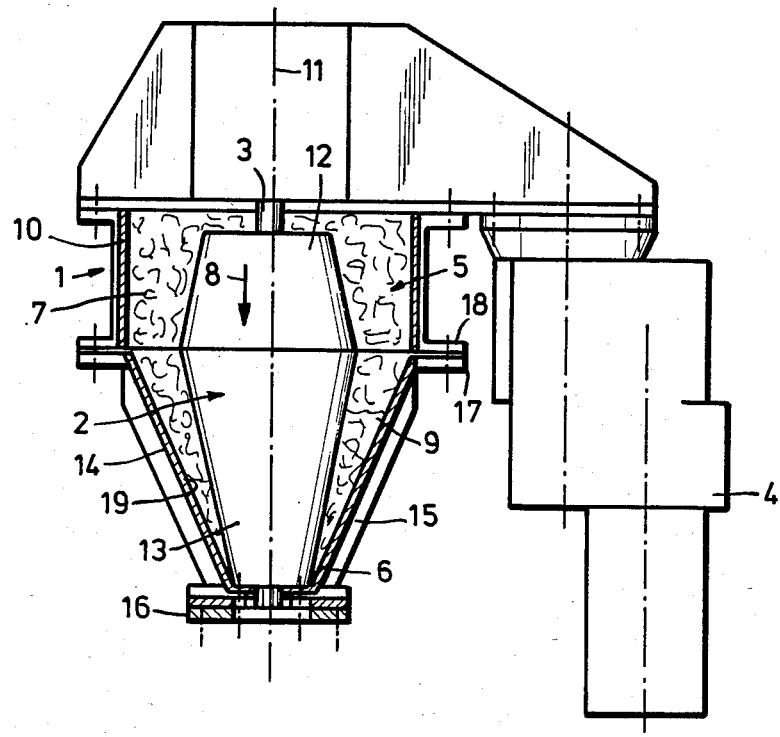
Fig.2
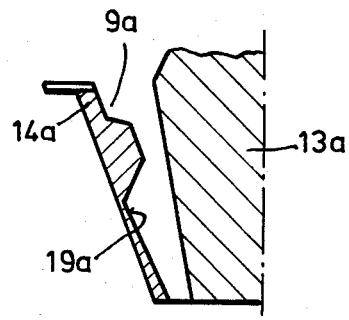
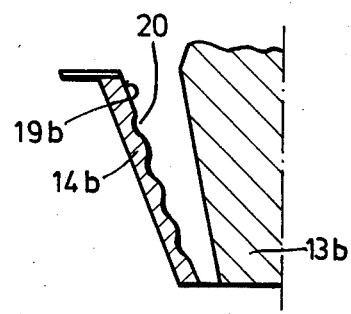
Fig.3

APPARATUS FOR PROCESSING MATERIAL

BACKGROUND OF THE INVENTION

The present invention relates to an apparatus for processing material, and includes a housing in which is accommodated, in a working chamber, a rotatably driven processing tool which, during the processing, conveys the material to an outlet of the housing.

An apparatus of this general type can be an extruder which processes plastic. Material in the form of melt, powder, granulated material, or agglomerate can be supplied to the apparatus by means of a feed hopper. A screw is accommodated in the extruder housing as the processing tool, and conveys the material to the outlet of the working chamber, whereby the material is compacted or fluxed. However, such an apparatus is structurally very complex, expensive to manufacture, and essentially suitable only for one type of process.

It is an object of the present invention to provide an apparatus of the aforementioned general type, which is economical to manufacture as a result of a simple construction, and with which very different types of materials can be processed in different manners, for example by being homogenized, predosed, plasticized, or mixed.

BRIEF DESCRIPTION OF THE DRAWINGS

This object, and other objects and advantages of the present invention, will appear more clearly from the following specification in conjunction with the accompanying drawings, in which:

FIG. 1 schematically illustrates one embodiment of the inventive apparatus; and

FIGS. 2, 2A, 2B, 3, 3A, and 3B are each a partial section of a further inventive embodiment of the housing of the apparatus of FIG. 1.

SUMMARY OF THE INVENTION

Figure 2A:
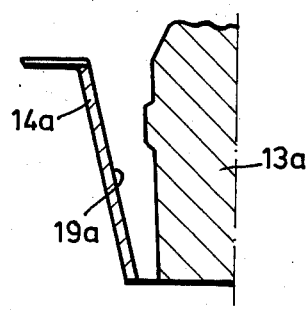

The apparatus of the present invention is characterized primarily in that the working chamber has a conveying section which tapers in cross section in the direction toward the outlet, and which, in the conveying direction of the material, passes into a processing section which tapers more markedly in the direction toward the outlet than does the conveying section.

With the apparatus of the present invention, the working chamber is divided into two sections which are connected to one another in the direction of conveyance, namely into the conveying section and the following processing section. Since both sections of the working chamber are tapered in cross section in the direction toward the outlet, the materials are compacted throughout the time that they pass through the working chamber. However, since the processing section tapers more markedly than does the conveying section, the actual processing of the material takes place in the processing section, whereas in the conveying section the material is essentially only conveyed into the processing section. In cooperation with the processing tool which extends in both sections of the working chamber, the material can be handled in very different ways. Even the most different types of materials can be handled and processed in the working chambers to form thermoplastic and/or duroplastic and/or mineral and/or infusible products. With the inventive apparatus, the materials can be homogenized, predosed, plasticized, or mixed. Thus, the inventive apparatus can be used for many purposes.

Pursuant to specific embodiments of the present invention, the processing section can extend to the outlet. The processing section can also be longer than the conveying section.

The conveying section may be defined by wall portions of the housing which are disposed parallel to the axis of rotation of the processing tool, and is preferably defined by a cylindrical housing portion That part of the processing tool which is disposed in the conveying section may expand conically in the direction toward the outlet. The working part of the processing tool disposed in the processing section may also be conical. In particular, this working part of the processing tool may taper conically in the direction toward the outlet.

The processing section may be defined by wall portions of the housing which are disposed at an angle to the axis of rotation of the processing tool. Preferably, these wall portions are defined by a housing portion which tapers conically in the direction toward the outlet. This housing portion which is associated with the processing section can be detachably connected to the remainder of the housing.

The inner wall of the housing portion associated with the processing section, and/or the outer surface of the working part of the processing tool, may be provided with profiling.

That part of the processing tool disposed in the conveying section can be adapted to be cooled, while the working part of the processing tool can be heated or cooled.

The processing tool may be driven by a two-stage drive mechanism.

DESCRIPTION OF PREFERRED EMBODIMENTS

Referring now to the drawings in detail, the inventive apparatus can be used for homogenizing, predosing, plasticizing, thermally mixing, and thermally compounding thermoplastic and/or duroplastic and/or mineral and/or infusible products.

The apparatus includes a housing 1 in which is accommodated a processing tool 2. The tool 2 is disposed on a shaft 3 which, via a non-illustrated gearing, is driven by a motor 4. The housing 1 has a working chamber 5 in which the processing tool 2 is rotatable, and in which the products which are supplied can be handled and processed. The housing 1 has an outlet 6 through which the finished products are conveyed out of the working chamber 5.

The working chamber 5 has a conveying section 7 which has a cross section which tapers in the direction toward the outlet 6. In the direction of conveyance 8 of the products, the conveying section 7 passes into a processing section 9 of the working chamber 5. Although the processing section 9 also tapers in the direction toward the outlet 6, it does so to a greater extent than does the conveying section 7. The processing section 9 extends to the outlet 6, so that the products are processed from the transition into this processing section all the way to their exit from the outlet 6. Therefore, the products can be intensively handled, so that the processed product which exits from the outlet 6 has optimum properties. The processing section 9 is longer than the conveying section 7. The section 7 essentially serves only to uniformly convey the supplied products into the processing section 9, so that the latter is filled during the entire duration of processing.

The tapering of the cross section of the conveying section 7 can be achieved by having the side wall 10 of the housing 1 extend conically in the direction toward the outlet 6, and having the processing tool 2 in this section be cylindrical or also conically tapered. However, pursuant to a structurally simple and preferred embodiment of the present invention, the conveying section 7 is defined by wall portions 10 of the housing 1 which are disposed parallel to the axis of rotation 11 of the processing tool 2. Preferably, the conveying section 7 is defined by a cylindrical part of the housing, while that part 12 of the processing tool 2 which is disposed in the section 7 conically. widens in the direction toward the outlet 6. This part 12 of the tool 2 is formed by a truncated cone which is centrally disposed in the conveying section 7. As a result, the section 7 has an annular construction. Tne tapering of the cross section of the conveying section 7 of the working chamber 5 is relatively slight, so that the products which are to be handled or processed are only slightly compacted in this region.

The working part 13 of the processing tool 2 is disposed in the processing section 9 and is also conical. As shown in FIG. 1, the working part 13 of the tool 2 tapers in the direction toward the outlet 6. In order to obtain an optimum handling and processing of the products in the processing section 9 of the working chamber 5, the working part 13 extends all the way to the outlet 6, so that the entire length of the processing section 9 can be utilized for processing the products. The processing section 9 is defined by wall portions 14 of the housing 1 which extend at an angle to the axis of rotation 11 of the processing tool 2. The wall portions 14 are preferably a housing portion which tapers conically in the direction toward the outlet 6. The cone angle of the housing portion 14 is greater than the cone angle of the working part 13 of the processing tool 2. Thus, the processing section 9 is defined by two cone surfaces which have different angles of inclination. The cross sectional taper of the processing section 9 in the direction toward the outlet 6 is considerably greater than is the case with the conveying section 7, since processing of the products is to take place in the section 9.

As a result of the construction previously described, the processing tool 2 forms a double cone with which is achieved in a structurally very simple manner the different changes of cross sectional area in the two sections 7 and 9 of the working chamber 5. The cone part 12 of the processing tool 2 is cooled in a customary manner, and serves as the actual conveying part of the apparatus. The lower working part 13 serves as the mixing or plasticizing part, and is heated in a customary manner. As a result, especially a plasticizing process is enhanced in the processing section 9. As a result of being heated, the working part 13 can be maintained at the same temperature as the product which is being subjected to plasticizing, so that no undesired cooling occurs in the region of the working part 13 during the plasticizing process. So that undesired cooling of the plasticized product also does not occur at the housing part 14, the latter is also heated, and for this purpose is equipped with a heating jacket 15 or the like. The temperature can, for example, be controlled from about 40° C. to about 800° C., so that the most favorable temperature for the process being undertaken can be set. The working part 13, too, can be heated in this temperature range.

At the outlet 6, a discharge tool or a homogenizing or mixing screen 16 is mounted on the housing part 14.

In the working chamber 5, the products are conveyed by means of centrifugal force, and by reduction of the viscosity of the product, to this discharge tool or screen 16. The discharge tool 15 serves for profiling of the discharge product, or for generating counterpressure in conjunction with the centrifugal force. The drive mechanism 4 is such that the processing tool 2 can be turned at a speed of between about 40 and about 200 revolutions per minute. The drive mechanism 4 can also be a two-stage drive, with which the processing tool 2 can, for example, be turned five revolutions in the clockwise direction and two revolutions in the counterclockwise direction in order in this way to achieve a better homogenization or a centrifugal force discharge effect.

The inventive apparatus can also be used to process viscose-elastic products. For this purpose, the working part 13 is cooled to a low temperature, for example with liquid nitrogen, in order to thereby achieve a porosity of the product which is to be processed. This viscose-elastic product can then be easily broken up in the processing section 9 and, for example, be converted into granulated material.

The inventive apparatus can furthermore also be used as a mixer for pasty material, and can have any number of components.

By means of a flange 17, the housing part 14 can be detachably connected to a flange 18 of the cylindrical housing part 10. As a result, the housing part 14 can be easily replaced by a differently designed housing part. After the housing part 14 has been removed, the processing tool 2 can also be replaced by a different tool. For example, the cross sectional taper of the processing section 9 of the working chamber 5 must be different during plasticizing than during mixing of products. Thus, depending upon the desired operation, the housing part 14 and/or the processing tool 2 can be replaced.

Figure 2B:
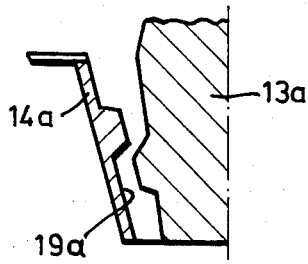

In the embodiment of FIG. 1, the inner wall 19 of the housing part 14 is smooth; the conical surface of the working part 13 of the processing tool 2 is also smooth. However, as shown in FIGS. 2 and 3, the inner wall of the housing part can also be profiled. Thus, the inner wall 19a of the housing part 14a can have an irregular profile, so that the cross section of the processing section 9a does not decrease continuously in the direction of the outlet. As shown in FIG. 2, the cross section of the processing section 9a can decrease very rapidly, so that a high degree of compacting of the product takes place in this region In this manner, the profiling can be optimally adapted to the product which is be processed and/or to the desired operation. In this embodiment, the conical surface of the working part 13a is smooth, but it can also be provided with a profile. Thus, as shown in the modifications of FIGS. 2A and 2B, the inner wall 19a and/or the conical surface of the working part 13a can be profiled.

Figure 3A:
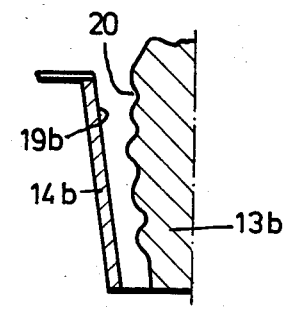
Figure 3B:
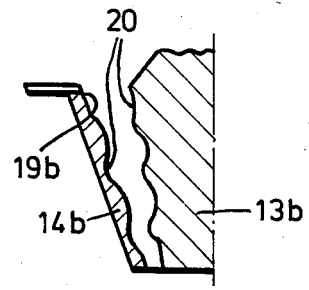

In the embodiment illustrated in FIG. 3, the inner wall 19b of the housing part 14b is provided with a corrugation 20. The apparatus constructed in this manner is suitable for grinding viscose-elastic products which are cooled to low temperatures in the aforementioned manner. Although the conical surface of the working part 13b is smooth in this embodiment, it can also be provided with a profile, as shown in FIGS. 3A and 3B.

Since the products in the working chamber 5 are finished processed, they can be delivered from the outlet 6 directly into a press, between rollers, etc., for further processing. It is not necessary to temporarily store the products.

The present invention is, of course, in no way restricted to the specific disclosure of the specification and drawings, but also encompasses any modifications within the scope of the appended claims.

What I claim is:

1. An apparatus for processing material, comprising:
   a housing having an outlet, and a working chamber which includes a conveying section and a processing section, with said conveying section passing into said processing section; said conveying section receives said material and conveys it in a direction of conveyance into said processing section; said conveying section has a cross section which tapers in the direction toward said outlet; said processing section also has a cross section which tapers in the direction toward said outlet, with the taper of said processing section being more marked than the taper of said conveying section; and
   a rotatably driven processing tool which is accommodated in said working chamber, and which during processing conveys saiu material to said outlet.

2. An apparatus according to claim 1, in which said processing section extends to, and communicates with, said outlet.

3. An apparatus according to claim 1, in which said processing section is longer than said conveying section.

4. An apparatus according to claim 1, in which said processing tool has an axis of rotation; in which said housing has wall portions which are disposed parallel to said axis of rotation of said processing tool; said conveying section is delimited by said wall portions of said housing; and in which a part of said processing tool is located in said conveying section, with said part of said processing tool being expanded conically in the direction toward said outlet.

5. An apparatus according to claim 4, in which said wall portions of said housing are in the form of a cylindrical housing part.

6. An apparatus according to claim 4, in which a working part of said processing tool is located in said processing section, with said working part of said processing tool being conical.

7. An apparatus according to claim 6, in which said working part of said processing tool tapers conically in the direction toward said outlet.

8. An apparatus according to claim 7, in which said housing has further wall portions which are disposed at an angle to said axis of rotation of said processing tool; said processing section is delimited by said further wall portions of said housing.

9. An apparatus according to claim 8, in which said further wall portions of said housing are in the form of a housing part which tapers conically in the direction toward said outlet.

10. An apparatus according to claim 8, in which that housing part which is associated with said processing section is detachably connected to that housing part which is associated with said conveying section.

11. An apparatus according to claim 8, in which said working part of said processing tool has an outer surface which essentially faces an inner wall of said housing part which is associated with said processing section; at least one of said outer surface of said working part of said processing tool, and said inner wall of said housing part which is associated with said processing section, is provided with a profiling.

12. An apparatus according to claim 8, in which said part of said processing tool which is located in said conveying section is adapted to be cooled.

13. An apparatus according to claim 12, in which said working part of said processing tool is adapted to be heated or cooled.

14. An apparatus according to claim 8, which includes a two-stage drive mechanism which is operatively connected to said processing tool for driving the latter.

* * * * *